Patented Nov. 27, 1951

2,576,138

UNITED STATES PATENT OFFICE 2,576,138

PRODUCTION OF SULFITE ESTERS

Alphonse Pechukas, Akron, Ohio, assignor to Pittsburgh Plate Glass Company, Allegheny County, Pa., a corporation of Pennsylvania No Drawing. Application January 2, 1947, Serial No. 719,929

8 Claims. (Cl. 260—456)

This invention relates to novel sulfites and to novel methods of producing sulfites of beta haloalcohols. The term "beta haloalcohols" and "beta chloroalcohols" means alcohols having halogen or chlorine, as the case may be, attached to a carbon atom next to a carbinol group,

In accordance with the present invention it has been found that such sulfites may be prepared by reaction of thionyl chloride with an epoxide, particularly an epoxide in which the oxygen atom is linked to adjacent carbon atoms and which therefore contains the group

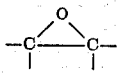

or

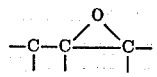

which the two carbon atoms to which the oxygen atom is linked, are linked to groups, such as hydrogen but other than acidic —OH groups. These epoxides are referred to hereinafter as 1,2 epoxides.

New and valuable sulfites of beta haloalcohols have been provided according to this invention. The reaction appears to proceed in accordance with the following equation:

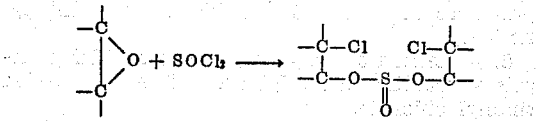

where

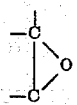

represents the epoxy group of the epoxy compound. Various isomers of the halo esters are formed. Thus when butadiene monoxide (1,2-epoxybutene-3) is reacted with thionylchloride, mixtures of bis (chloromethylvinylcarbinyl) sulfite and bis(2-chloro-3-butenyl) sulfite are prepared.

The sulfites prepared according to this invention generally are liquids which are comparatively stable at room temperature. However, they hydrolyze readily when heated in contact with water.

These esters are valuable intermediates and may be used for the production of other compounds such as quaternary ammonium sulphonates.

They are also valuable solvents or plasticizers for synthetic resins and plastics including cellulose acetate or nitrate, polyvinyl acetate, polyvinyl chloride, polymethyl methacrylate, etc.

The production of these compounds is accomplished by mixing the reactants, usually at room temperature or below, and allowing the mixture to stand. Since considerable heat is evolved the reaction mixture generally is cooled to prevent excessive overheating. However the reaction may be conducted at temperatures above room temperature, for example 50° C. to 100° C. at least in the later stages where evolution of heat reaction is not excessive. Solvents may be present if desired. For example, the process may be conducted using an initial concentration of the sulfite to be produced as a solvent. In general the reaction is conducted using essentially anhydrous reactants. Small quantities of water are not usually objectionable. However, large amounts of water hydrolyze the reactants and/or reaction products. Catalysts such as ferric chloride, iron chloride, zinc chloride, tertiary amines including pyridine or quinoline or other Friedel-Crafts catalyst may be used to facilitate the reaction. However the reaction usually proceeds without catalyst.

The reaction of thionyl chloride with epoxides is general in character and may be applied to various aliphatic and cycloaliphatic epoxides, particularly those containing the group

including alkylene epoxides, ethylene oxide, 1,2 propylene oxide, butylene epoxide, or isobutylene epoxide, epoxides of diolefins and their polymers including both monoepoxides and polyepoxides such as butadiene monoxide, butadiene dimer monoxide, isoprene monoxide, butadiene diepoxide, butadiene dimer diepoxide or the monoepoxides and diepoxides of cyclopentadiene or dicyclopentadiene or the substituted epoxides such as glycidol, epichlorohydrin, glycidic acid, glycidyl ethyl ether, glycidyl allyl ether, epicyanohydrin, or the cycloaliphatic oxides such as cyclohexene oxide, cyclopentene oxide, cyclopentadiene oxide and other corresponding oxides of other aliphatic olefins including cycloaliphatic olefins.

Resinous esters are obtained when thionyl chloride is reacted with diepoxides or polyepoxides such as butadiene dimer diepoxide, etc. Peroxide polymerizable esters are obtained when monoxides of dienes such as butadiene monoxide, chloroprene monoxide or 4-vinyl-1,2-epoxy cyclohexane are reacted with thionyl chloride. These latter polymerizable esters may be polymerized by heating in the presence of anhydrous peroxy catalysts such as benzoyl peroxide, lauroyl peroxide, acetone peroxide or other catalyst capable of catalyzing polymerization of olefin groups.

The following examples are illustrative.

Example 1

Twenty-four grams of thionyl chloride containing a trace of zinc chloride was introduced into a flask provided with a reflux condenser cooled with a Dry Ice-acetone mixture and an ice bath. Over a period of two hours, 18 grams of ethylene oxide was passed into the thionyl chloride while the mixture was stirred constantly and the temperature of the mixture was maintained at 10–15° C. When the addition of the ethylene oxide was complete the product was stirred for 30 minutes at room temperature and then fractionated. Bis (2-chloroethyl) sulfite was recovered as a liquid fraction boiling in the range 128 to 141° C. at 10 millimeters pressure.

Example 2

The process of Example 1 was repeated using 135.6 grams of thionyl chloride and adding 100 grams of ethylene oxide over a period of two and one-half hours and stirring at room temperature for an additional hour. No zinc chloride or other catalyst was present. An 83 percent yield of bis (2-chloroethyl) sulfite was secured as a water white liquid distilling at 129 to 133° C. at a pressure of 10 millimeters and having an index of refraction $n_D^{20}=1.4814$.

Example 3

To 152.3 grams of thionyl chloride containing a trace of zinc chloride was added dropwise, over a period of three and one-quarter hours, 148.5 grams of propylene oxide. The reaction mixture was stirred during the addition and the temperature of the mixture was maintained at 10–15° C. After addition of the propylene oxide was completed, the mixture was stirred at room temperature for two hours and then the product was distilled. Bis chloropropyl sulfite was recovered as a fraction boiling at 122–124° C. at 6 millimeters pressure and having an index of refraction $n_D^{20}$ of 1.4705. This product is a water white liquid which darkens on standing and comprises a mixture of the esters having the probable structures

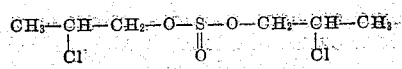

and

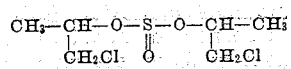

Example 4

Over a period of one and three-quarter hours, 175 grams of 1,2-epoxybutene-3 was added with stirring to 149 grams of thionyl chloride while keeping the temperature of the mixture at 10 to 15° C. After stirring for an additional one and one-half hours at room temperature, some polymerization occurred during the reaction with consequent production of a quantity of solid polymer. Upon fractionation of the liquid reaction product in the presence of pyrogallol as a polymerization inhibitor, the bis (chlorobutenyl) sulfite was secured. This ester was a dark liquid having a sharp odor, boiling at 140–145° C. at 6 millimeters pressure and having an index of refraction $n_D^{20}$ of 1.4945. This product is a mixture of chlorobutenyl esters having the probable structures

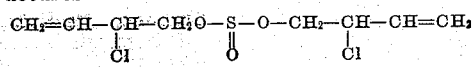

and

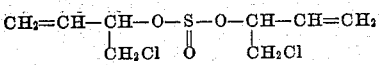

Example 5

To 59 grams thionyl chloride in a 500 cc. 3-necked flask provided with a thermometer stirrer and water cooled condenser, 92.5 grams of epichlorohydrin was added over a period of 1.25 hours while maintaining the temperature at 4° C. by means of an ice bath. After the addition, the mixture was allowed to stand for 1.25 hours while warming to room temperature. The reaction product was distilled and the sulfite ester of dichloropropanol was collected as a distillation fraction. This ester is a colorless liquid boiling at 150–157° C. at one millimeter pressure and a refractive index of $n_D^{20}=1.5070$. This ester is a mixture of various isomers of bis (dichloropropyl) sulfite.

While the invention has been particularly concerned with the chloro esters prepared by reaction of the above olefin oxides with thionyl chloride it is not limited thereto since other halo esters may be prepared. For example, thionyl bromide may be reacted with the above oxides, for example as shown in Examples 1 to 5 using thionyl bromide in lieu of thionyl chloride, to form the corresponding bromo esters.

Although the present invention has been described with particular reference to the specific details of certain embodiments thereof, it is not intended that such details shall be regarded as limitations upon the scope of the invention except insofar as included in the accompanying claims.

What is claimed:

1. A method of preparing an ester which comprises reacting a 1,2 epoxide with a thionyl halide.

2. A method of preparing an ester which comprises reacting an aliphatic 1,2 epoxide with thionyl chloride.

3. A bis (beta halo n-butenyl) sulfite of beta halo normal butenyl alcohol having an unsaturated carbon-carbon linkage which is separated by at least one carbon atom from the carbinol group.

4. A method of preparing an ester which comprises reacting a diolefine epoxide with thionyl chloride.

5. A method of preparing an ester which comprises reacting butadiene monoxide with thionyl chloride.

6. A method of preparing an ester, which comprises reacting an olefin monoxide with thionyl chloride.

7. A method of preparing an ester, which comprises reacting ethylene oxide with thionyl chloride.

8. Mixtures of bis (beta chloro n-butenyl) sulfites which comprise said sulfites of the beta n-butenyl alcohols: 2-chloro-3 butenol and chloromethyl vinyl carbinol.

ALPHONSE PECHUKAS.

REFERENCES CITED

The following references are of record in the file of this patent:

UNITED STATES PATENTS

| Number | Name | Date |
|---|---|---|
| 2,377,148 | Hechenbleikner | May 29, 1945 |

OTHER REFERENCES

Malinovskii, "Chem. Abstracts," vol. 34, col. 375 (1940) (original in J. Gen. Chem. U. S. S. R.).

Malinovskii, "Chem. Abstracts," vol. 35, col. 4736 (1941) (original in J. Gen. Chem. U. S. S. R.).

Bedos, "Comptes rendus" (Paris), vol. 183, pages 562–565 (1926).